(12) United States Patent
Weimar et al.

(10) Patent No.: US 11,473,461 B2
(45) Date of Patent: Oct. 18, 2022

(54) APPARATUS AND METHOD FOR BLENDING OIL ON A MARINE VESSEL

(71) Applicant: Maersk A/S, Copenhagen K (DK)

(72) Inventors: Henrik Bak Weimar, København K (DK); Martin Olsson, Malmo (SE); Mark Stephen Wells, Hellerup (DK); Jens Byrgesen, Charlottenlund (DK)

(73) Assignee: Maersk A/S, Copenhagen K (DK)

( * ) Notice: Subject to any disclaimer, the term of this patent is extended or adjusted under 35 U.S.C. 154(b) by 0 days.

(21) Appl. No.: 16/855,653

(22) Filed: Apr. 22, 2020

(65) Prior Publication Data

US 2020/0248595 A1 Aug. 6, 2020

Related U.S. Application Data

(63) Continuation of application No. PCT/EP2018/079616, filed on Oct. 30, 2018.

(30) Foreign Application Priority Data

Oct. 31, 2017 (EP) ..................................... 17199483

(51) Int. Cl.
*F02M 37/22* (2019.01)
*F16N 39/08* (2006.01)
(Continued)

(52) U.S. Cl.
CPC .......... *F01M 11/0458* (2013.01); *F01M 9/02* (2013.01); *F02B 61/04* (2013.01);
(Continued)

(58) Field of Classification Search
CPC . F02M 37/22; F16N 2200/00; F16N 2200/04; F16N 2200/12; F16N 2210/06; F16N 2250/36; F16N 2270/50
See application file for complete search history.

(56) References Cited

U.S. PATENT DOCUMENTS 3,565,252 A * 2/1971 Sheehy ................. B01D 17/02
210/197
5,602,085 A * 2/1997 Peterson .............. C10M 111/04
508/591
(Continued)

FOREIGN PATENT DOCUMENTS

CN 1646796 A 7/2005
CN 1875171 A 12/2006
(Continued)

OTHER PUBLICATIONS

International Search Report and Written Opinion dated Feb. 20, 2019 for PCT Application No. PCT/EP2018/079616.
(Continued)

*Primary Examiner* — Long T Tran
(74) *Attorney, Agent, or Firm* — EIP US LLP

(57) ABSTRACT

An oil blending system for a marine diesel two-stroke engine and/or generator comprises a blender having at least one inlet for receiving a lubrication oil and at least one other component and at least one outlet for outputting a mixed lubrication oil composition to the engine or generator. A blender controller is configured to receive parameter data on the current lubrication oil status used in the engine or generator and receive parameter data on the current engine and/or generator status. The blender controller is also configured to automatically determine whether the currently used lubrication oil is within a predetermined parameter range based on the current engine and/or generator status. If the current lubrication oil is outside a predetermined parameter threshold, the blender controller is configured to determine a new lubrication oil composition for the engine or generator.

15 Claims, 6 Drawing Sheets

(51) Int. Cl.
*F01M 11/04* (2006.01)
*F01M 9/02* (2006.01)
*F02B 61/04* (2006.01)
*F02B 75/02* (2006.01)

(52) U.S. Cl.
CPC .............. *F02B 75/02* (2013.01); *F16N 39/08* (2013.01); *F01M 2011/0475* (2013.01); *F01M 2250/60* (2013.01); *F02B 2075/025* (2013.01); *F16N 2200/00* (2013.01); *F16N 2200/04* (2013.01); *F16N 2200/08* (2013.01); *F16N 2200/10* (2013.01); *F16N 2200/12* (2013.01); *F16N 2210/06* (2013.01); *F16N 2210/20* (2013.01); *F16N 2250/08* (2013.01); *F16N 2250/36* (2013.01); *F16N 2270/50* (2013.01)

(56) References Cited

U.S. PATENT DOCUMENTS

| | | | | |
|---|---|---|---|---|
| 5,749,339 | A * | 5/1998 | Graham | F01M 11/0458 123/73 AD |
| 5,970,942 | A * | 10/1999 | Koeberlein | F01M 11/0458 123/196 R |
| 6,213,080 | B1 * | 4/2001 | Marsh | F01M 11/0458 123/196 R |
| 7,414,014 | B2 * | 8/2008 | Natoli | C10M 175/0091 508/528 |
| 7,490,586 | B1 * | 2/2009 | Weller | F01M 9/02 184/104.2 |
| 2003/0159672 | A1 | 8/2003 | Carey et al. | |
| 2003/0196632 | A1 | 10/2003 | Reischman et al. | |
| 2004/0144355 | A1 | 7/2004 | Carey et al. | |
| 2004/0211386 | A1 * | 10/2004 | Luther | B60R 17/02 123/196 R |
| 2006/0068995 | A1 | 3/2006 | Natoli et al. | |
| 2007/0084271 | A1 * | 4/2007 | Boyle | G01N 33/2876 73/53.05 |
| 2008/0207474 | A1 * | 8/2008 | Damm | G01M 3/202 73/40 |
| 2018/0251194 | A1 * | 9/2018 | Takaishi | B63H 21/38 |

FOREIGN PATENT DOCUMENTS

| | | |
|---|---|---|
| CN | 101048484 A | 10/2007 |
| CN | 101115911 A | 1/2008 |
| CN | 105073965 A | 11/2015 |
| CN | 105531449 A | 4/2016 |
| EP | 1640442 A1 | 3/2006 |
| EP | 2767578 A1 | 8/2014 |
| WO | 2015036543 A1 | 3/2015 |

OTHER PUBLICATIONS

United Kingdom Search Report dated May 7, 2018 for GB Application No. 17199483.3.

* cited by examiner

APPARATUS AND METHOD FOR
BLENDING OIL ON A MARINE VESSEL

CROSS-REFERENCE TO RELATED APPLICATIONS

This application is a continuation of International Application No. PCT/EP2018/079616, filed Oct. 30, 2018 which claims priority to EP Application No. 17199483.3, filed Oct. 31, 2017, under 35 U.S.C. § 119(a). Each of the above-referenced patent applications is incorporated by reference in its entirety.

BACKGROUND OF THE INVENTION

Field of the Invention

The present invention relates to an apparatus and method for blending oil on a marine vessel. In particular, the present invention relates to automatically determining an oil composition for a marine engine and/or generator.

Description of the Related Technology

Many ships comprise two-stroke diesel engines which are very large and require periodic maintenance and overhaul. The maintenance and overhauls of large two-stroke marine engines are often expensive and time consuming. Furthermore, large scale maintenance of the engine will require taking the ship into dry dock. This means that the vessel is taken out of commission and is undesirable for a ship owner.

Accordingly, the better maintenance and care of a ship machinery such as the engine and generator may reduce the frequency that the vessel machinery needs to be overhauled.

One way the engine of a vessel undergoes wear is from contaminants in the fuel. For example, often marine fuel oil will comprise a component of sulphur. During combustion the sulphur will be converted to sulphuric acid inside the combustion chamber of the engine. The sulphuric acid has a deleterious effect on the parts of the engine and in particular the cylinder and piston rings.

It is known to provide a lubrication cylinder oil to the marine diesel engine of differing alkalinity to manage different levels of acidity experienced by the engine. One such arrangement is to have multiple tanks of cylinder oil at different alkalinity. Since the lubrication cylinder oil is consumed in the combustion cycle, the alkaline cylinder oil is used to counter the acidity caused by e.g. sulphur contaminants. In one known arrangement a first tank may hold e.g. 25 TBN (total base number) cylinder oil and another tank may hold e.g. 100 TBN. Total Base Number is an indication of the alkalinity of the oil.

In another arrangement as shown in EP 2 767 578 and EP 1 640 442, it is known to blend a cylinder oil on the vessel itself. The concept is to blend separate components to generate a cylinder oil or blend a fresh cylinder oil with a used oil to generate a new cylinder oil. A problem with EP 2 767 578 is that the blending system on the marine vessel requires significant time to adapt the on board manufacture of the lubrication oil to the changing conditions of the engine. In particular, the marine vessel requires a cylinder oil buffer tank. This is also known as a cylinder oil day tank. The day tank is required to provide a reserve of pre-blended cylinder oil for immediate use by the engine.

This means that currently the fuel to a marine two stroke engine can be changed in about two to four hours however the production and modification of the on-board lubrication takes two to three days because the cylinder oil day tank and associated pipes must be replaced with freshly blended oil. Therefore, a lubrication oil which is suitable for the current conditions of the engine will take time to produce. The delay in providing lubrication oil will mean that the engine is less efficient and experiences greater wear.

Furthermore EP 2 767 578 is also disadvantageous because the only input other than a used system oil into the blender is a fresh cylinder oil. This means that the blending process to produce a new cylinder oil less flexible for the needs of the engine.

Embodiments of the present invention aim to address the aforementioned problems.

SUMMARY

According to an aspect of the present invention there is an oil blending system for a marine diesel two-stroke engine and/or generator comprising: a blender having at least one inlet for receiving a lubrication oil and at least one other component and at least one outlet for outputting a mixed lubrication oil composition to the engine or generator; a blender controller configured to: receive parameter data on the current lubrication oil status used in the engine or generator and receive parameter data on the current engine and/or generator status; automatically determine whether the currently used lubrication oil is within a predetermined parameter range based on the current engine and/or generator status; and if the current lubrication oil is outside a predetermined parameter threshold, determine a new lubrication oil composition for the engine or generator.

This means that the oil is blended under greater control and precision. The blender controller receives information and dynamically controls the composition of the oil which means there is a lower risk of an incorrect oil composition. The blender controller also means that the composition of the oil can be determined by a variety of engine and/or oil parameters increasing the flexibility and improving the performance of the engine.

The new lubrication oil composition may be determined based on the current engine and/or generator status and/or the current used oil status data.

The blender controller may be connected to at least a lubrication oil valve or pump controller and at least one other component valve or pump controller wherein the blender controller is configured to send control signals to the valve controllers and/or pump controller for controlling the amount of lubrication oil and at least one other component.

The received parameter data of the current used lubrication oil status may be data received from at least one sensor monitoring the current status of the current lubrication oil status.

The at least one sensor may be one or more of the following: an alkalinity sensor, a viscosity sensor, a temperature sensor, a sulphate sensor, or a contaminate sensor.

The received parameter data on the current engine status may be received from at least one sensor monitoring the engine, stored engine parameters in memory or another controller associated with the marine diesel two-stroke engine.

The at least one sensor may be an engine mounted sensor for monitoring at least one of the following: acidity, temperature, elemental contaminants, exhaust, fuel type, fuel line valve status, current fuel parameters, current engine load.

The at least one sensor mounted on the engine may comprise a wireless transmitter receiver for communicating with the blender controller.

The blender controller may receive other parameter data relating to one or more of the following: air temperature, water temperature sensor, humidity sensor, weather information, ship status.

The mixed oil composition may be a cylinder oil, a system oil or a generator oil.

The at least one other component may be a viscosity agent, a detergent, a dispersant, a friction modifier, an anti-wear agent, an alkalinity agent, an antifoam agent, flocculent agent, pour point depressant, antioxidant agent, a polymer thickener agent, corrosion protection agent, extreme pressure additives, or an additive concentrate package.

The at least one other component may comprise a used system oil, a fresh system oil, a used cylinder oil, a fresh cylinder oil, a used generator oil or a fresh generator oil to be mixed with the lubrication oil.

The blender may comprise a plurality of outlets for different mixed oil compositions.

The blender may comprise a plurality of inlets for receiving different components or base oil.

In a second aspect, there is a method for blending oil for a marine two-stroke engine and/or generator comprising: receiving a lubrication oil and at least one other component in an inlet of a blender; receiving in a blender controller parameter data on the current lubrication oil status used in the engine or generator, receiving parameter data on the current engine status or generator automatically determining whether the currently used lubrication oil is within a predetermined parameter range based on the current engine and/or generator status; determining a new lubrication oil composition for the engine or generator if the currently used lubrication oil is outside the predetermined parameter threshold.

The method may comprise blending the received lubrication oil and at least one other component; and outputting from least one outlet of the blender to the engine or generator a new mixed lubrication oil composition.

Various other aspects and further embodiments are also described in the following detailed description and in the attached claims with reference to the accompanying drawings, in which:

DETAILED DESCRIPTION OF CERTAIN INVENTIVE EMBODIMENTS

Figure 1:
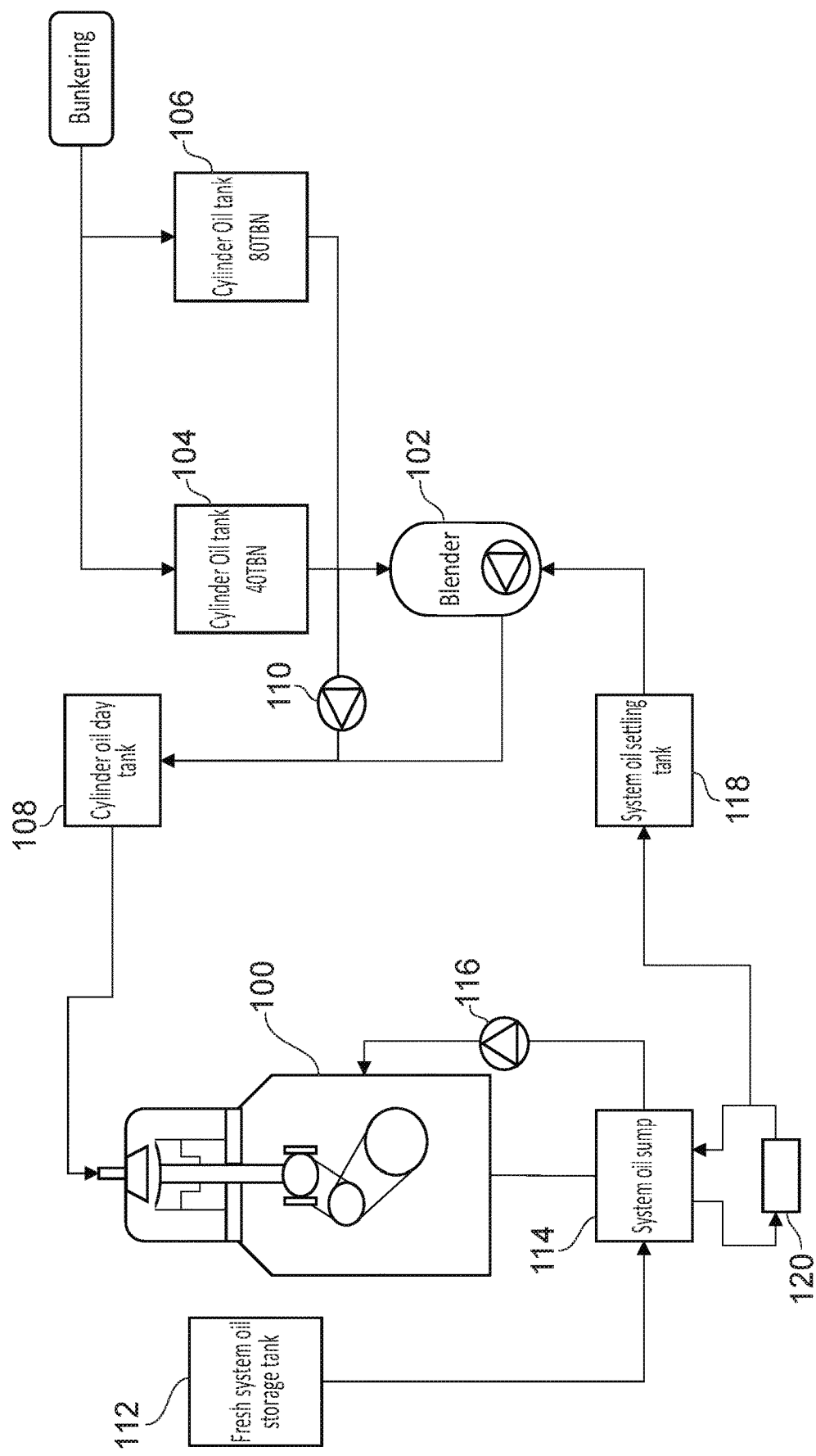
FIG. 1 shows a prior art arrangement of an on board marine blending arrangement.

FIG. 1 shows a schematic view of an on board marine lubrication oil blending arrangement. FIG. 1 represents the known existing blending arrangements. A blender 102 is in fluid communication with a first cylinder oil tank 104 and a second cylinder oil tank 106. The first cylinder oil tank typically holds 40 TBN cylinder oil and the second cylinder oil tank typically holds 100 to 320 TBN. The cylinder oil tanks 104, 106 are refilled when the vessel is bunkered. The term bunkering refers to the process of refuelling the vessel, which includes refilling the respective cylinder oil tanks 104, 106. The cylinder oil tanks 104, 106 can be in fluid communication and connected directly to the engine 100 via a cylinder oil day tank 108. The cylinder oil day tank 108 provides a buffer of pre-blended cylinder oil for use by the engine 100. The cylinder oil from the first and second cylinder oil tanks 104, 106 is pumped directly to the cylinder oil day tank 108 via pump 110.

When a blend of cylinder oil is required, the blender 102 is used. The blender 102 receives fresh cylinder oil from one or both of the cylinder oil tanks 104, 106. The blender 102 is further connected to the system oil system of the engine 100. The system oil is replenished from a fresh system oil storage tank 112 and pumped to the engine 100 via pump 116. The fresh system oil is input into the system oil sump 114 from the fresh system oil storage tank 112. System oil is transferred from the system oil sump 114 and stored in a system oil settling tank 118. The system oil 114 is processed in a centrifugal separator 120 before the system oil is sent to the system oil settling tank 118.

The blender 102 generates a new cylinder oil by mixing different amounts of fresh cylinder oil and used system oil.

The problem with the prior art arrangement in FIG. 1 is that the current blending arrangement requires time to flush and remove blended cylinder oil from the system when the engine conditions change. Currently a fuel to a marine two stroke engine can be changed in about two to four hours however the production and modification of the on-board lubrication takes two to three days. For example, the cylinder oil day tank 108 and the system oil settling tank 118 may be emptied before introducing the new cylinder oil. Indeed, even when the cylinder oil day tank 108 is empty, the pipes connecting the cylinder oil day tank 108 and the engine 100 can contain a significant amount of previously blended cylinder oil. For example, the connecting pipes can be up to 100 to 150 m in length and 5 cm in diameter holding at least 200 litres of oil.

Figure 2:
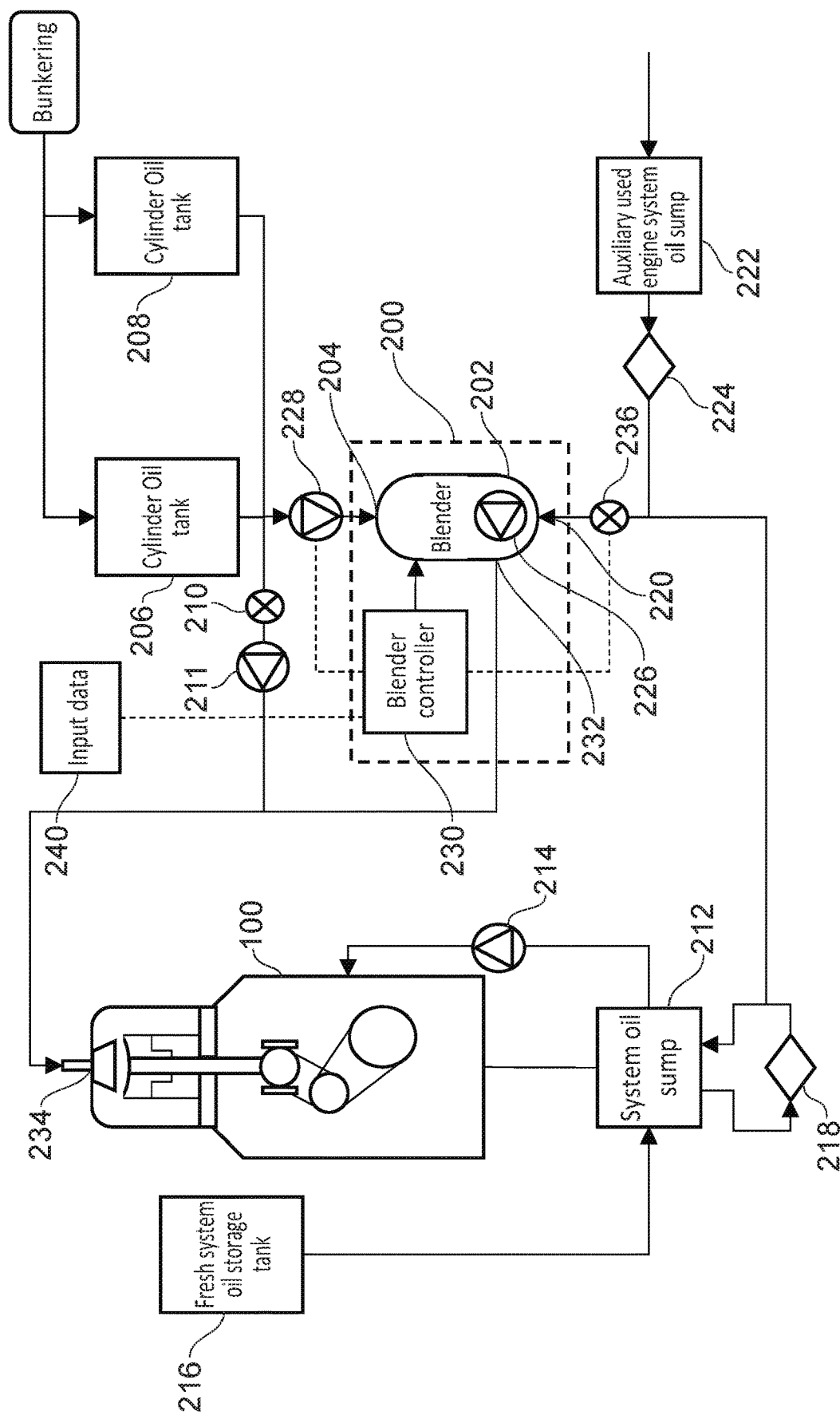
FIG. 2 shows a schematic view of an oil blending system.

Turning to FIG. 2, an embodiment will now be described. FIG. 2 shows a schematic arrangement of an oil blending system 200 for a marine diesel two-stroke engine 100. In some embodiments the oil blending system 200 is alternatively or additionally for a generator on a vessel. The oil blending system 200 is suitable for a large ocean going vessel such as a container ship. However, the oil blending system 200 can be used on any vessel that employs a two-stroke diesel marine engine. Alternatively the blending system is for blending oil for any other rotating machinery that uses oil.

The oil blending system 200 comprises a blender 202 for blending different components into a lubricating oil for use in the engine 100 or a generator. The blender 202 comprises an inlet 204 for receiving one or more components for a lubricating oil. In some embodiments, there are a plurality of different inlets 204 for different components and fresh oil. The one or more components of the lubricating oil can be a first cylinder oil in a first cylinder oil tank 206 and a second cylinder oil in a second cylinder oil tank 208. The first and second cylinder oils have different alkalinity and have different TBN values. In one embodiment, the first cylinder oil has a TBN of 140 and the second cylinder oil has a TBN of 70. The second cylinder oil can be used to mix with the first cylinder oil. In other embodiments, the second cylinder oil is a reserve, pre-blended cylinder oil for use if the blending apparatus 200 is not operational. The second cylinder oil can be selectively pumped to the engine 100 using valve 210 and cylinder oil transfer pump 211.

In some embodiments (not shown in FIG. 2) the first and second cylinder oil tank 206, 208 are in fluid communication with the blender 202 having separate inlets 204.

The blender 202 is also in fluid communication with one or more supplies of used oil. In one embodiment, the blender 202 is in fluid communication with a system oil sump 212. The system oil sump 212 contains the system oil for the engine 100 and is recycled to the engine with system oil pump 214. The system oil is replenished with fresh system oil stored in the fresh system oil storage tank 216. Used system oil is removed from the sump 212 using a filter 218. The filter 218 can also be used in conjunction with a centrifugal separator (not shown). The filter 218 typically removes contaminants and burnt combusted material. Furthermore, the filter 218 removes solid particles such as small metal particulate matter produced from engine wear or soot, varnish, oxidation or other solid contaminants etc.

The filter 218 is in fluid communication with the blender 202. The used system oil is input into the blender via a used oil inlet 220. Additionally or alternatively, used oil from an auxiliary engine is in fluid communication with the used oil inlet 220. The auxiliary engine sump 222 is connected to an auxiliary sump filter 224 which removes contaminants and particulates from the auxiliary engine used oil in a similar way to the filter 218. The auxiliary used engine system oil sump is in fluid communication with the oil circuit of the auxiliary engine which is represent by an arrow into the sump 222. In some embodiments there are two or more used oil inlets 220, respectively for the used system oil and the used auxiliary engine oil. In some embodiments 10% of the used auxiliary engine system oil is input in to the blender 202.

The blender 202 comprises a pump 226 for moving one or more fluids around the lubrication oil circuit. The pump 226 is arranged to pump the used system oil, the first and second cylinder oil and the auxiliary used system oil. In other embodiments, separate pumps are used to pump each separate fluid. A cylinder oil pump 228 is used to transfer cylinder oil from the first and/or second cylinder oil tank 206, 208 to the blender 202. The other separate pumps are not shown.

The blender 202 comprises a blending chamber for mixing the lubrication oil and one or more other components for producing a new mixed lubrication oil. The blending chamber (not shown) may also comprise a mechanical element for positively encouraging the multiple components to mix. In other embodiments the blending chamber can comprises a passive arrangement whereby the components of the new lubrication pass over structural elements and cause the components to mix through the force of gravity.

The blending system 200 comprises a blender controller 230. The blender controller 230 is configured to control the operation of the blender 202. The blender controller 230 is configured to selectively operate the blender pump 226. Furthermore, the controller is configured to selectively operate one or move valves and pumps to control the flow of the lubrication oil and at least one other components input into the blender 202. The blender controller 230 is configured to control the pump 226 to output the new mixed lubrication from an output 232 of the blender 202. The blender controller 230 determines how much new mixed lubrication oil is delivered to the cylinder input 234 of the engine 100.

The blender controller 230 receives input data 240 relating to the current engine status and/or the current lubrication oil status. The input data 240 can be sensor information obtained in real time or additionally or alternatively the input data 240 can be stored information concerning the current operating conditions of the engine and/or the currently used lubrication oil.

The blender controller 230 as shown in FIG. 2 controls the blender 202 such that the blender 202 combines a fresh cylinder oil from a first or second tank 206, 208 with a used system oil or a used auxiliary used oil to generate a new cylinder oil.

Figure 3:
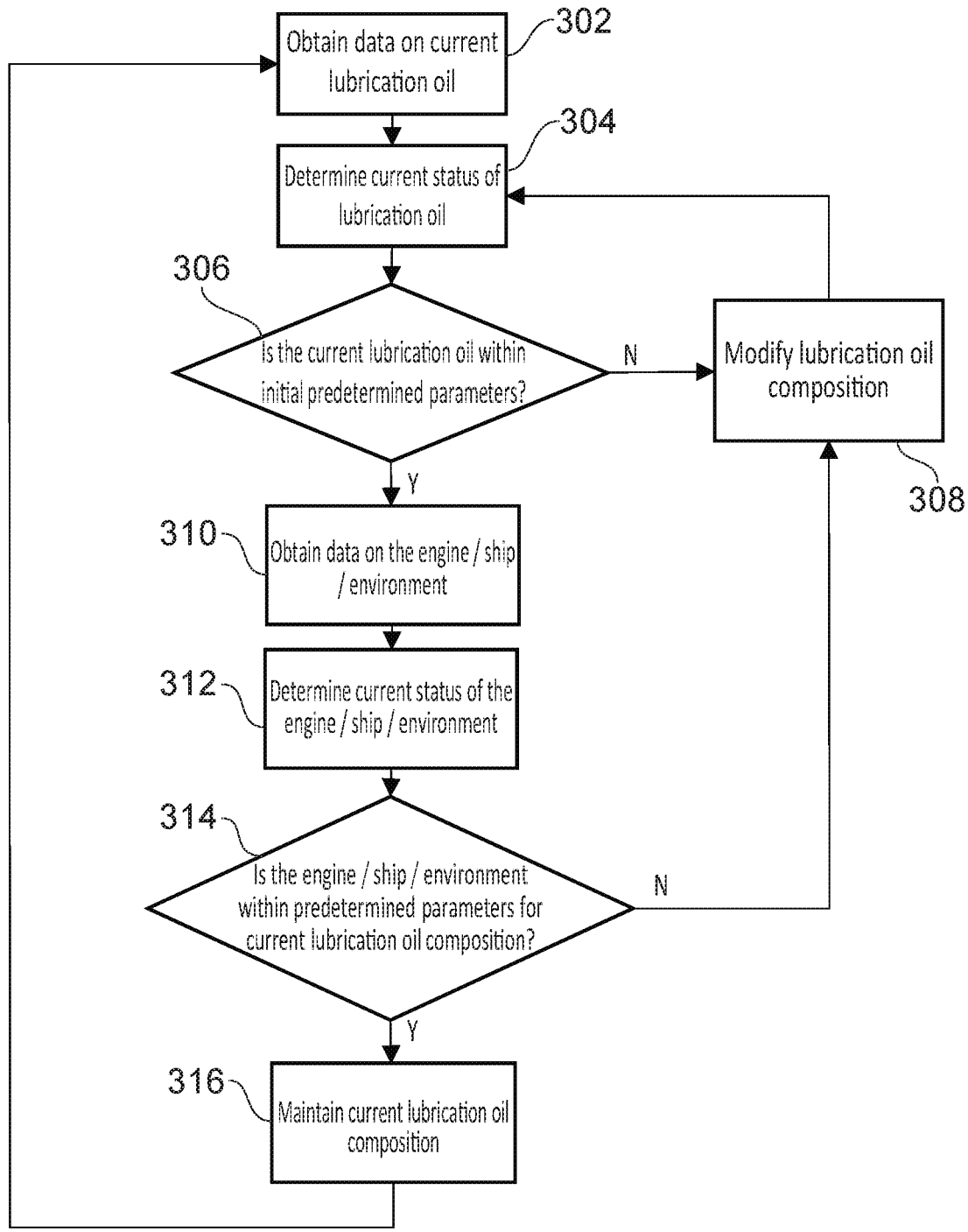
FIG. 3 shows a flow diagram of the method carried out by the blender controller.
Figure 4:
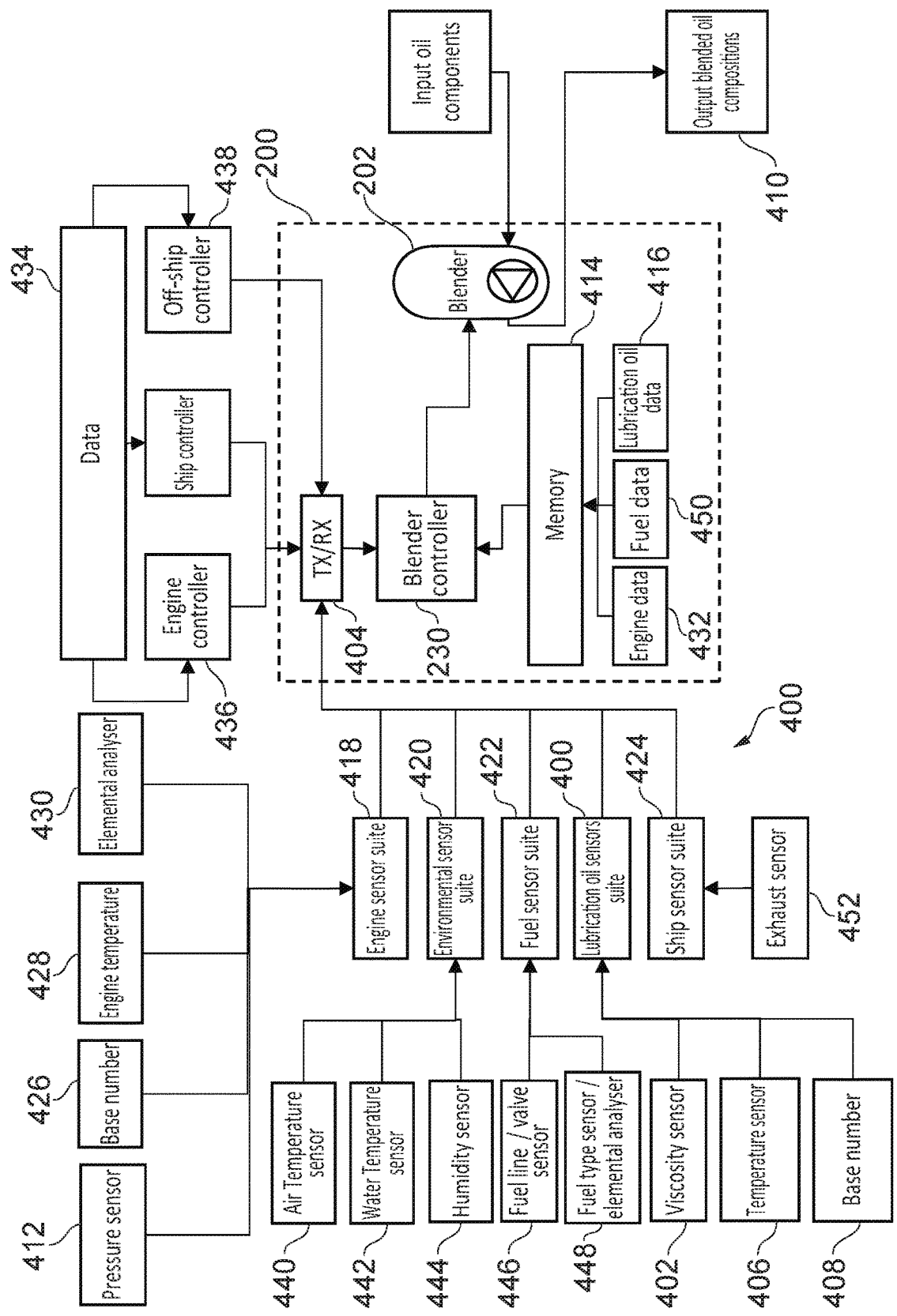
FIG. 4 shows a schematic view of the blender controller.

The process steps of the blender controller will now be discussed in reference with respect to FIG. 3 and FIG. 4. FIG. 3 shows a process flow diagram for the method that the blender controller 230 takes when operating and controlling the blender 202. FIG. 4 shows a schematic diagram of the blender controller 230.

In step 302, the blender controller 230 receives data 240 on the status of the current lubrication oil. Lubrication oil refers to any suitable oil for lubricating engine machinery. The lubrication oil can be system oil, cylinder oil, generator oil or any other suitable lubrication oil. In respect of FIGS. 2 and 3, the blended lubrication oil is referred to as cylinder oil for the purposes of clarity.

In some embodiments, the data on the current cylinder oil is data received in real-time. One or more cylinder oil sensors of a lubrication oil sensor suite 400 measure parameters of the current cylinder oil and send a measurement signal to the blender controller 230.

The sensor suite 400 is a plurality of sensors arranged to measure different parameters of the same part of the vessel. The sensor suite 400 is in communication with the blender controller 230. The sensor suite 400 can have a wired connection with the blender controller 230. Alternatively, the sensor suite 400 or the individual sensors have a wireless connection with the blender controller 230 and each of the sensor suite 400 or the individual sensors and the blender controller 230 comprise a transmitter and receiver 404 for sending and receiving measurement signals. If the sensor suite 400 or individual sensors have a wireless connection with the blender controller 230, then this makes installation of the sensor suite 400 for the blender controller 230 easier and cheaper. Although engine rooms may be hard wired, alternatively in some embodiments the wireless connection is an unlicensed network such as Wifi, Bluetooth or any other suitable wireless connection.

In some embodiments, the sensor suite 400 comprises a viscosity sensor 402 to determine the thickness and viscosity of the current cylinder oil. Typically the viscosity sensor 402 is placed in line in the connecting pipes between the output 232 of the blender 202 and the cylinder input 234 of the engine 100. In this way as the mixed cylinder oil flows past the viscosity sensor 402, the instantaneous viscosity of the newly mixed cylinder oil can be measured.

In other embodiments, other parameters of the cylinder oil such as temperature by a lubrication oil temperature sensor 406, alkalinity or acidity indicated by a base number 408. In some embodiments the base number sensor 408 is an infrared sensor. The temperature sensor 406 can be a cylinder and bearing temperature sensor and in some embodiments is a thermocouple located in the engine. The base number information can be manually entered or calculated from parameters of the cylinder oil. Alternatively dynamic real time sensor measurement of the base number of the cylinder can be achieved with a calibrated infrared sensor to detect calcium content which may indicate the alkalinity of the oil. Any other suitable sensor can be used to determine a required parameter of the cylinder oil. The sensor suite 400 can continuously send measurement signals to the blender controller 230. In other embodiments, the sensor suite 400 can periodically send measurement signals for example every minute. In other embodiments, the sensor suite 400 send measurement signals only when the blender controller 230 polls the sensor 400 and sends a request signal to the sensor 402, 406, 408, 412. In other embodiments, the blender controller 230 can determine the cylinder oil parameter based on a calculated value.

In reference to FIG. 2, the lubrication oil sensor suite 400, determines the alkalinity, the viscosity and temperature of the mixed cylinder oil which is outputted from the blender 202. This gives information relating to the current status of the output blended cylinder oil compositions 410.

Once the blender controller 230 has received the measured data on the blender cylinder oil, the blender controller 230 determines the current status of the cylinder oil as shown in step 304 of FIG. 3. The blender controller 230 determines one or more parameters of the current cylinder oil for example the current temperature, alkalinity, pressure, viscosity or parameters calculated from one or more measured parameters.

The blender controller 230 then makes a determination as to whether the current lubrication oil is within acceptable initial predetermined ranges as shown in optional step 306. The blender controller 230 compares the measured or determined parameters of the current cylinder oil against predetermined desired threshold parameters for the cylinder oil.

The first comparison step in 306 is an optional initial step to determine whether the cylinder oil is within acceptable initial operational parameters. For example, engine manufacturing guidelines and best practice based on documented data from engine in question state that the cylinder oil should have a certain operating alkalinity (total base number TBN). If the cylinder oil does not even meet these requirements, then the cylinder oil should be modified as set out in step 308 before even determining the current status of the engine 100.

The acceptable operational parameters 416 of the cylinder oil are stored in memory 414 of the blender controller 230. Historical blending data of the engine can be stored in memory logging the composition of the blended cylinder oil. Other information such as technical specifications of desired cylinder oil compositions can be stored in the memory 414.

In some embodiments, a desired blended cylinder oil has an ambient temperature outside the engine of between 5 C to 50 C, a pressure of the blended cylinder oil is at atmospheric pressure, a total base number of between 15 to 150 BN and a viscosity of between 10 to 22 cSt.

The blender controller 230 modifies the cylinder oil composition by changing the relative proportions of the initial input components. For example, the blender controller 230 sends a control signal to operate a pump 228 to control the flow of the cylinder oil from the first cylinder tank 206 and a valve 236 to control the flow of the used system oil to the blender 202. The blender controller 230 can operate and control any number of valves and pumps relating to inputs and outputs of the blender 202. By varying the relative percentage components of the blended cylinder oil, the parameters of the resulting blending cylinder oil can be modified. Communication connections between the blender controller 230 and other components such as sensors, valves and pumps are represented with dotted lines.

If the blender controller 230 determines that the cylinder oil is within acceptable initial parameters, the blender controller 230 receives data on the current engine 100 or generator status as shown in step 310. In reference to FIGS. 2 and 3, only data on the engine status is provided, but in alternative embodiments, information relating to the generator or other machinery can be provided. In some embodiments the order of steps 304 and 312 are reversed. That is the current status of the engine is determined in step 310 before the step of determining the current status of the lubrication oil in step 304. The order in which steps 302, 304 and 306 and then steps 310, 312, 314 is optional.

Information relating to the engine status can be broad and varied to build up a detailed picture of the operating conditions of the engine and the vessel. The blender controller 230 may receive information relating from one or more sources such as a sensor or stored data.

Many different factors can determine how the engine operates and consumes fuel. Variations in how the engine burns the fuel will affect how the cylinder oil lubricates the engine 100. Turning to FIG. 4, the different sensors connected to the blender controller 230 will now be discussed. In addition to the lubrication oil (e.g. the cylinder oil) sensor suite 400, there are engine sensor suite 418, environmental sensor suite 420, fuel sensor suite 422 and a ship sensor suite. Each of these sensor suites comprises one or more sensors for determining and/or measuring parameters of part of the vessel each of which can affect how the engine performs.

The engine sensor suite comprises at least a system oil acidity/alkalinity sensor 426 for determining the current acidity of the system oil. The base number information can be manually entered or calculated from parameters of the cylinder oil. Dynamic real time sensor measurement of the base number of the cylinder oil can be achieved with a calibrated infrared sensor.

The engine sensor suite may also comprise an engine temperature sensor 428 for determining the current operating temperature of the engine. The operating temperature of the engine 100 is an indication of the load of the engine 100 and a measure of how cleanly the engine 100 is burning the fuel. The engine sensor suite 418 may also comprise an engine load sensor (not shown) and an elemental analyser 430. The elemental sensor 430 determines the current composition of the combustion chamber in the engine 100. One such fuel sensor is an x-ray fluorescence (XRF) sensor which fires an x-ray beam into the fuel sensor and the resulting fluorescence from electron orbit decay is measured and the frequency of the fluorescence is used to determine the elemental composition of the fuel. Other types of elemental analysers can be used such as e.g. mass spectrometers. In some embodiments the elemental sensor 430 is a used as a scuffing sensor for detecting metal abrading against metal and detecting metal particles in the oil. The information relating to the amount of elements such as iron in the combustion chamber can indicate the current performance of the engine 100. The engine sensor suite 418 can also determine the pressure in the engine by a pressure sensor 412 can additionally or alternatively be measured and communicated to the blender controller 230. The amount of pressure in the engine can determine the dew point of water and how much sulphuric acid may be created as a combustion by product.

Although not shown in FIG. 4, the engine sensor suite 418 may optionally comprise additional sensors for monitoring the status of the cylinder liner of the engine including the temperature, thickness of the cylinder liner. By monitoring the status of the cylinder liner, an indication of the current wear of the engine can be accurately determined.

At the same time the blender controller 230 may receive other data relating to the engine 100. In particular, the blender controller 230 may store in memory 414 information relating to the engine data 432. The stored engine data 432 comprises manufacturer's technical specifications such as size, age, number of pistons. Additional information can be inputted by the ship operator during commissioning. Furthermore the engine data can comprise the data concerning the historical liner wear and wear of other parts of the engine. Additional data 434 can be provided to the blender controller 230. For example, information from the engine controller 436 is provided to the blender controller. The engine controller 436 can provide data such as current load of the engine, current speed of the engine (for example revolutions per minute, RPM) time since the last overhaul of the engine.

Even more information can be provided to the blender controller 230 from data storage remote from the vessel. For example, the engine manufacturer can push a technical operational parameter update from an off-ship controller 438 over the air which can be used to update the existing engine information 432 stored in memory 414.

The engine sensor suite 418 provides measurement information relating directly to the engine 100. However additional factors can affect the performance of the engine. For example, environmental conditions will play a large part as to how the fuel burns in the combustion chamber of the engine 100. An environmental sensor suite 420 comprises a plurality of sensors for measuring environmental parameters for controlling the blended cylinder oil properties. The environmental sensor suite 420 can optionally be used to determine how the fuel burns. In particular, the environmental suite comprises an air temperature sensor 440, a water temperature sensor 442 and a humidity sensor 444.

The inlet air temperature and the humidity affects the amount of water that can be contained in the air. This means that the air temperature sensor 440 measurement and the humidity sensor 444 measurement are used by the blender controller to determine how much water content is in the air. This means that the amount of water in the combustion chamber can be determined by the blender controller 230.

The blender controller 230 is also connected to a fuel sensor suite 422. The fuel sensor suite 422 comprises a plurality of sensors relating to the status and parameters of the current fuel being consumed by the engine 100. The fuel sensor suite 422 comprises a fuel type sensor 448 to give an indication of the fuel supplied to the engine 100.

Additionally, or alternatively sensors associated with fuel lines, fuel line valves, valve positions or fuel flow meters send signals to the blender controller 230 so that the blender controller receives information on the current fuel type being used by the engine 100. During operation, if there are multiple fuel types on board the vessel, then the blender controller 230, in some embodiments, receives a signal as to when the respective fuel types are supplied to the engine 100. Fuel valves change over (not shown) will have a status condition (ON/OFF) and the blender controller 230 will determine which fuel is being supplied to the engine 100 depending on the current status of the fuel valves change over. Accordingly, the controller will know whether there is a fuel with a high sulphur content or a low content. Optionally a sulphur sensor 448 is located in the fuel line so that the blender controller can determine the amount of sulphur in the fuel currently being consumed. One such fuel sensor is an x-ray fluorescence (XRF) sensor which fires an x-ray beam into the fuel sensor and the resulting fluorescence from electron orbit decay is measured and the frequency of the fluorescence is used to determine the elemental composition of the fuel. Other types of elemental analysers can be used such as e.g. mass spectrometers. A sulphur sensor in the fuel line is advantageous because the amount of sulphur in the fuel pipes will vary over time as the fuel transitions from one fuel to the other if the fuel pipes are not flushed before the transition. Accordingly, the cylinder oil can be adapted dynamically as the sulphur content in the fuel to the engine varies. Additional fuel data 450 is stored in memory.

Other sensor suites can also be used to determine other information about the vessel. For example, there may be a ship sensor suite 424 which comprise an exhaust sensor 452. The exhaust sensor 452 can be sulphur dioxide sensor for determining the amount of sulphur dioxide in the exhaust fumes.

The blender controller 230 determines the current status of the engine 100 as shown in step 312 of FIG. 3. In particular, the blender controller 230 can determine composition of the fuel and the type of burn currently occurring in the engine 100. This means that the blender controller 230 can determine the amount of contaminants that affect the engine 100. In one embodiment, the blender controller 230 determines the amount of predicted sulphuric acid generated in the combustion chamber of the engine 100.

Typically, the changing conditions of the engine 100 will change the SOx and NOx emissions and the generation of sulphuric acid and nitric acid from combustion. The changing acidic conditions means that the engine 100 will experience differing levels of damage, including cold corrosion, due to the level of acid in the engine 100.

Since the engine 100 is a two-stroke engine, the cylinder oil is burnt with the fuel. This means that the cylinder oil composition can be used to adapt to changes in the engine 100 and fuel conditions.

In some embodiments, the amount of water in the combustion chamber of the engine 100, the amount of acid contaminant in the engine can be predicted. For example, in humid conditions, there will be a higher moisture content in the air. This means that there is more water to allow sulphuric acid to be created during combustion. The increase in acid will increase the wear on the engine 100. Accordingly, the humidity sensor 444 can send a signal to the blender controller 230 which can modify the alkalinity of the cylinder oil. Additionally, or alternatively the blender controller 230 can receive weather (ambient conditions) data for basing the modification of the cylinder oil.

In some embodiments, the blender controller 230 can determine the amount of sulphur dioxide in different chemical compensations in the exhaust fume from the exhaust sensor 452 and determine can indicate how much sulphur is in the fuel and how much sulphuric acid is being generated during the combustion.

In other embodiments, the blender controller 230 receives from memory 414 data relating to the technical specifications of the fuel such as the sulphur content. The blender controller 230 further retrieves from memory the type of fuel which is stored in particular fuel tanks can be recorded in memory. When the blender controller 230 receives signals from the fuel change over valves, the blender controller 230 can determine the current sulphur content of the current fuel in the engine 100 and the predicted sulphuric acid generation in the combustion.

In other embodiments if the engine 100 is idling or running slowing, then the temperature of the engine 100 will be lower. This means that the dew point of the sulphuric acid will be lower and the acidic conditions will be increased accordingly. The blender controller 230 can determined the increased acidic conditions based on the information from the engine temperature sensor 428, such as a thermocouple, and/or the engine controller 436. Likewise, the alkalinity of the cylinder oil can be adapted to the temperature or the current load of the engine 100.

Furthermore in one embodiment the blender controller 230 receives information of the load of the engine and/or the temperature of the engine. By receiving information on the current operational temperature of the engine, the blender controller 230 determines the required viscosity of the blended cylinder oil. If the engine is operating at a higher load, then the engine will be warmer and the cylinder oil will be used at a higher temperature. This means that the blended cylinder oil will be thinner than if the same blended cylinder oil is used at a lower engine temperature. If the blender controller 230 receives information that the engine is operating at a low load and a low temperature, then the blender controller 230 controls the blending system 200 to mix the cylinder oil with a lower viscosity to ensure the friction caused by the blended cylinder oil is not excessive. In contrast if the blender controller 230 receives information that the engine is operating at a high load and at a higher temperature, the blender controller 230 controls the blending system 200 to mix the cylinder oil to have a higher viscosity. The blender controller 230 in some embodiments can modify the viscosity by modifying the temperature of the components or the blended cylinder oil and/or using components with differing viscosities. The blender controller 230 in some embodiments is configured to control a heating element in the blending system 200 for heating the blended cylinder oil.

In other embodiments, the blender controller 230 can also receive data in respect of the engine condition, make and type. For example, the blender controller 230 may have stored in memory 414 the manufacturers operational data sheet or vessel specific data generated in-house. The age of the engine, the condition, size, pressure when it was last renovated can all be stored in the memory 414 and can be used to modify the cylinder oil. A new engine may be able to have a higher peak pressure and other design parameters which means that the dew point of the sulphuric acid will be different from an older engine. Accordingly, the blender controller 230 can change the alkalinity of the cylinder oil to the age of the engine 100.

In reference to step 312, and FIG. 2, the blender controller 230 determines the predicted alkalinity or TBN of the system oil based on the engine status parameters.

Once the blender controller 230 has determined a status of the of engine 100, the blender controller 230 automatically determines whether the cylinder oil parameters are within a predetermined range based on the current status of the engine 100. The step of automatically determining is shown in step 314.

The blender controller 230 compares the predicted alkalinity of the system oil with a predetermined parameter range. For example, the required TBN of the system oil is typically required to be within a certain range TBN 25 to TBN 160 Accordingly, the blender controller 230 determines whether the current parameters of the cylinder oil are suitable for maintaining the correct characteristics such as the alkalinity of the system oil. Specifically the blender controller 230 checks whether the current TBN of the cylinder oil manages to regulate the TBN of the system oil within the accepted predetermined range. The blender controller 230 determines whether the predicted system oil parameters are outside the predetermined parameter range.

If the blender controller 230 determines that the cylinder oil parameters are not within the predetermined range for the current engine status, then the blender controller 230 sends control signals to the blender 202 to modify the composition of the cylinder oil as discussed in step 308 previously. If the system oil is too low/high in a BN value, the blender controller 230 increases the alkalinity of the cylinder oil. If the system oil is too alkaline, the blender controller decreases the alkalinity of the cylinder oil.

This means that the cylinder oil is dynamically adjusted accordingly to the varying conditions of the engine 100 and the environment. If the blender controller 230 determines that the cylinder oil parameters are within the predetermined parameter range, then no modification of the cylinder oil composition is needed. The blender controller 230 maintains the current composition of the cylinder oil as shown in step 316.

Advantageously the oil blending system 200 does not require a cylinder oil day tank 108. This means that the blender controller 230 can measure changing engine conditions and quickly react by producing a cylinder oil which can be used without draining and flushing the cylinder oil system. This means the oil blending system 200 can provide a new cylinder oil composition within hours or even minutes of changing engine conditions.

In some embodiments, the blending system 200 is blending a cylinder oil according to a set of determine engine parameters and the engine parameters change. This means an amount of blended cylinder oil is contained within the blending system 200 which is potentially unsuitable for the changed engine parameters. In this way, the blender controller 200 can receive updated information on the engine parameters and the updated engine parameter information will be different from the original engine parameters. For example, the engine may be running at a different load, or the type of fuel may have changed.

The blender controller 230 determines that the blending system 200 comprises a blended cylinder oil which is not suitable for the changed conditions of the engine indicated by the received updated engine parameter information. The blender controller 230 determines the new desired blended cylinder oil composition based on the updated engine parameter information. The blender controller 230 then determines how the already blended cylinder oil can be modified to bring the composition of the cylinder oil within operational parameters. For example the blender controller 230 adds more base oil to dilute the blended cylinder oil and reduce the viscosity and/or the TBN.

Figure 5:
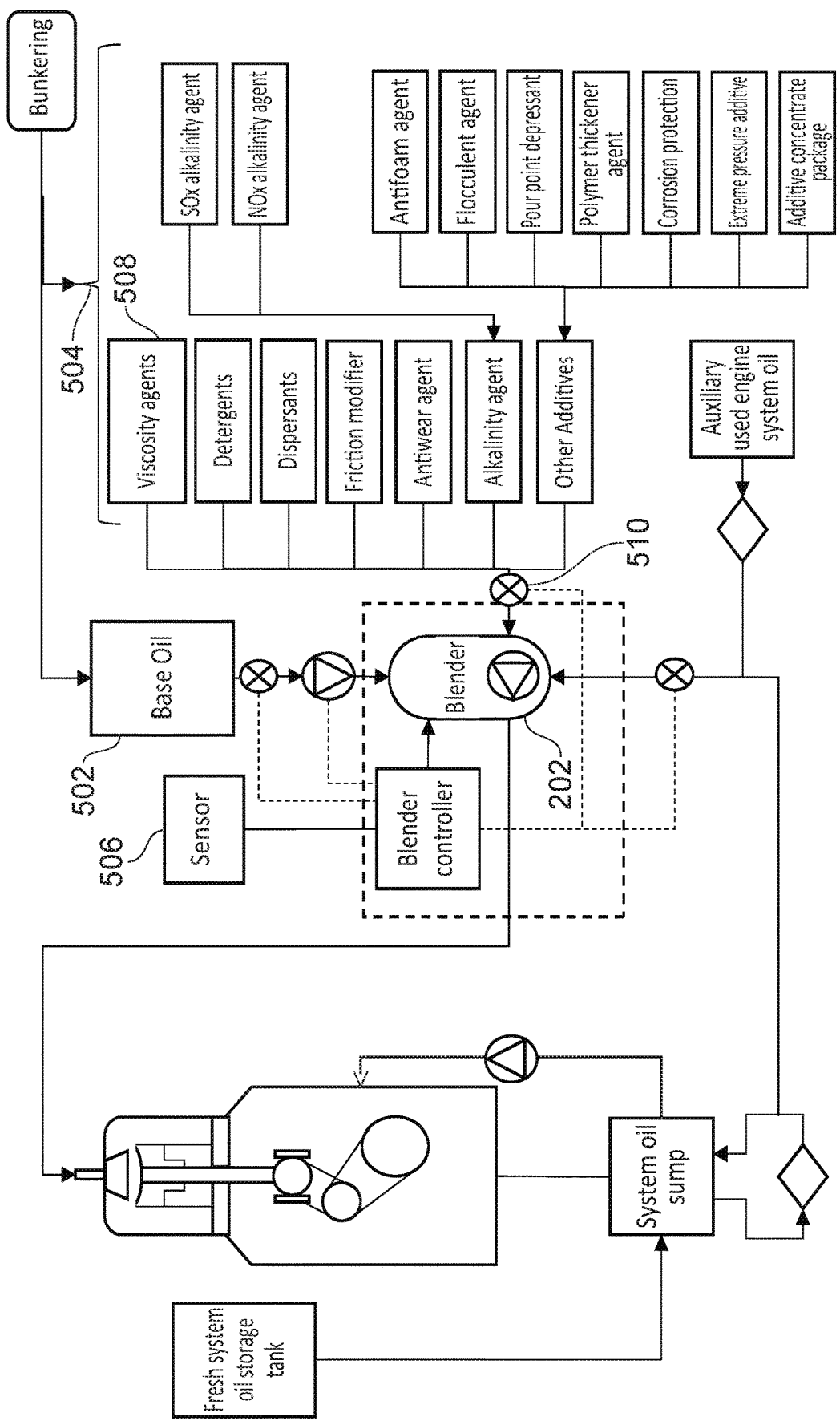
FIG. 5 shows another schematic view of an oil blending system.

Another embodiment will now be discussed in reference to FIG. 5. FIG. 5 discloses a schematic view of an oil blending system. The arrangement in FIG. 5 is the same as the arrangement discussed in reference to the embodiments shown in FIGS. 2, 3 and 4.

The different between FIGS. 5 and 2 is that the cylinder oil is blended from a base oil stored in a base oil storage tank 502 and one or more other components 504. In some embodiments, the base oil is a complex mixture of paraffins, naphthenes, and aromatics. These hydrocarbons have different molecular arrangements of hydrogen and carbon atoms. The hydrocarbon composition of base oils is related to the crude oil source and the type of refinery process used to manufacture them.

The base oil 502 is mixed with other components 504 to modify and vary one or more characteristics of the blended cylinder oil. The components can be one or more of the following viscosity agents, detergents, dispersants, friction modifiers, anti-wear agents, alkalinity agents, SOx alkalinity agent, NOx alkalinity agents, antifoam agent, flocculent agent, pour point depressant, polymer thickener agent, corrosion protection, extreme pressure additive and/or an additive concentrate package.

In some embodiments, the blender controller 230 is configured to control the blending system to provide a blended cylinder oil that includes detergents or dispersants for cleaning cylinder liner and/or piston rings. The detergents or dispersants in use may not affect the BN of the cylinder oil. In this way, the blender controller 230 is configured to generate blended cylinder oils that maintain and clean parts of the engine. The blender controller 230 may receive sensor information or input from an engine controller 436 that the cylinder liners or the piston rings require cleaning. In response to the received information relating to the engine condition, the blender controller 230 uses a dispersant or a detergent to clean parts of the engine.

Each component can be added in varying quantities in dependence on the received measured sensor data and the stored data in memory 414. Some of the components may be added in dependence on a plurality of sensor data or determined parameters.

It has been discussed with respect to the previous embodiments that the blender controller 230 can modified the composition of the cylinder oil to mitigate the corrosive effect of fuels that contain sulphur. However, the blender controller 230 is configured to control the blending system blend a cylinder oil that caters for a wide variety of different operating conditions and fuel types including low sulphur fuels.

In one embodiment, the sensor 506 can be a viscosity sensor to determine the viscosity of the blended cylinder oil. Alternatively, the viscosity sensor can determine the viscosity of the system oil. In addition to the alkalinity of the cylinder oil, the blender controller 230 can also be used to modify the viscosity of the cylinder oil. The process of monitoring and modifying the cylinder oil to maintain a specific viscosity is the same as discussed with respect to the embodiments shown in FIG. 3.

It is desirable to maintain the viscosity of the cylinder oil at an optimal viscosity. By maintaining the viscosity at a predetermined value, the viscosity of the cylinder oil can be better tailored to the engine parameters. This is advantageous over existing arrangements whereby the viscosity is maintained over a very wide range. By modifying the viscosity of the cylinder oil within a tight range such as a 5%-10% variation, the thickness of the cylinder oil is sufficient to keep the piston rings apart, but not so thick that energy is wasted on overcoming friction of the cylinder oil.

The controller can modify the viscosity of the oil by receiving a signal from an inline viscosity sensor. The controller then modifies the oil by thinning or thickening the lubricating oil accordingly to keep the oil within a predetermined viscosity range by adding a differing amount of viscosity agent 508.

The blender controller 230 is connected to and controls a valve 510 which determines the amount of one or more of the components is fed into the blender 202. In some embodiments, there are separate valve and valve controls, each connected to the blender controller 230, for each separate component shown in FIG. 5. For the purposes of clarity only one valve 510 is shown. Virtually any composition of cylinder oil can be achieved to react to any engine conditions because the blender controller 230 is producing the cylinder oil from the separate components.

This has the advantage that the automated blender can adapt to a diversifying fuel market which could see engines running on gas turbines, automotive diesel, crude oil, or some other unknown fuel type. Irrespective of the type of fuel the engine 100 is running on, the lubrication oil can be dynamically adapted. The cylinder oil can be modified to adapt to changes to the engine presented from using scrubber technology.

In another embodiment, the sensor 506 can be a sensor to determine one or more of: the detergency of the cylinder oil, the dispersant qualities of the cylinder oil, the friction properties of the cylinder oil and the anti-wear properties of the blended cylinder oil. Alternatively, the sensor can determine the same properties of the system oil. Alternatively, the blender controller 230 can be used to modify the dispersant, detergency, friction and/or the anti-wear properties of the cylinder oil. The process of monitoring and modifying the cylinder oil to maintain a specific parameter is the same as discussed with respect to the embodiments shown in FIG. 3.

It is desirable to maintain the dispersant, detergency, friction and/or the anti-wear properties of the cylinder oil at an optimal range to tailor the cylinder oil more effectively to the engine parameters. The controller can modify the dispersant, detergency, friction and/or the anti-wear properties of the oil by receiving a signal from the sensor 506. The controller then modifies the oil by adding one or more of the additives 504 to increase e.g. the dispersant, detergency, friction and/or the anti-wear properties or adding more base oil 502 to reduce the dispersant, detergency, friction and/or the anti-wear properties.

The blender controller 230 is connected to and controls a valve 510 which determines the amount of one or more of the components is fed into the blender 202.

This has the advantage that the automated blender can adapt to a diversifying fuel market which could see engines running on gas turbines, automotive diesel, crude oil, or some other unknown fuel type. Irrespective of the type of fuel the engine 100 is running on, the lubrication oil can be dynamically adapted. The cylinder oil can be modified to adapt to changes to the engine presented from using scrubber technology.

The embodiments as discussed with reference to FIGS. 2 to 5 contemplate the blender 202 generating a blended cylinder oil. In some embodiments, other lubrication oils can be blended such as system oil, main generator oil, auxiliary generator oil or any other machinery oil.

Figure 6:
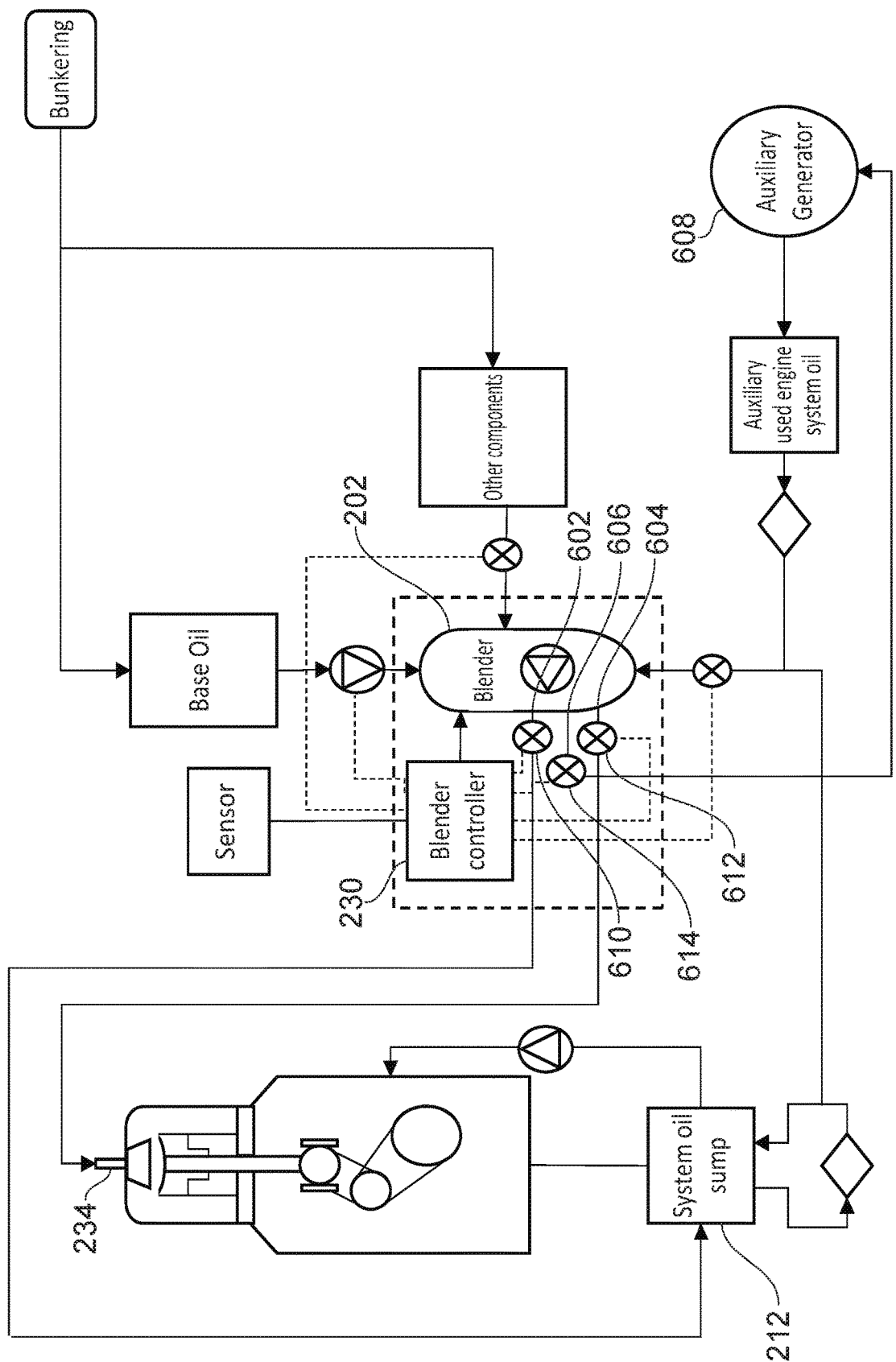
FIG. 6 shows yet another schematic view of an oil blending system.

Turning to FIG. 6 another embodiment will now be discussed. FIG. 6 shows a schematic view of another oil blending system. The arrangement as shown in FIG. 6 is the same as shown in previous embodiments discussed in reference to FIG. 5. One difference is that the blender 202 is arranged to blend oil for the system oil of the engine 100 and generator oil of auxiliary generator.

The blender 202 comprises a plurality of outlets for outputting the blended lubrication oil. The blender 202 comprises a first cylinder oil outlet 602 in fluid communication with the cylinder oil inlet 234. The blender 202 comprises a second system oil outlet 604 in fluid communication with the system oil sump 212. The blender 202 also comprises a third generator oil outlet 606 in fluid communication with the generator oil sump (not shown) of the main generator or the auxiliary generator 608.

Each of the first, second and third outlets 602, 604, 606 are respectively controlled with first valve 610, second valve 612 and third valve 614. The blender controller 230 is connected to and configured to selectively control each of the first, second and third valves 610, 612, 614. By providing separate outlets to the blender, the blend quality of the cylinder oil, the system oil and the generator oil can be controlled completely. This will mean that the is no dead volume between the pipes so that there is not requirement to flush out the previously blended oil. In some embodiments, there is a single outlet having a three-way valve for selecting one of the cylinder oil, system oil or the generator oil lubrication circuit.

In another embodiment, the blender controller 230 comprises a fail-safe mode. If a fault in the blending system 200 is detected, for example a valve is jammed or a sensor becomes faulty, the blender controller 230 can determine that the blending system 200 is malfunctioning. When the blender controller 230 determines that the blending system is not operating within normal parameters, the blending controller 230 controls the valve 210 to a pre-blended tank 206, 208. If the blender controller 230 detects a failure in the blending system 200, then the blender controller 230 will automatically switch to a tank 206, 208 with a preblended oil. In this case the preblended cylinder oil bypasses the blending system 200. This means that the cylinder oil can be transferred to the engine cylinder even if the blending system 200 is not working. This protects the engine from becoming damaged if no cylinder oil or incorrect cylinder oil can be transferred from the blending system 200.

In yet another embodiment the blender controller 230 comprises an operation mode for achieving maximum protection for the engine. Maximum protection ensures that damaging factors such as excessive wear and acidity are limited to the fullest extent. In this case, the cylinder oil is blended without regarding to the viscosity or engine performance. This means that there will be increased friction caused by the higher viscosity cylinder oil. However, the high viscosity cylinder oil will prevent or limit wear to the cylinder liner of the engine. The objective of maximum protection mode is to safeguard the engine to prevent further wear or damage to the engine. In one example a large amount of metallic particles are detected in the system oil by the elemental analyser 430 indicating an increased wear of the cylinder liner. Accordingly, the blender controller 230 determines that the conditions of the engine are outside the normal operating conditions and that continued operation under the current conditions will damage the engine. The blender controller 230 controls the valves 510, for the input components such that the viscosity and TBN are greatly increased. Optionally an anti-wear additive can also be blended.

In some embodiments the blender controller 230 is configured to blend cylinder oil individually for each separate cylinder in the engine. In this case, the blender controller 230 operates in the same way as previously discussed, but sequentially blends a different oil composition for the different cylinders. The blender controller 230 transfers the blended cylinder oil to the individual cylinders selectively with valves.

In another embodiment the blender controller 230 modifies the feed rate of components of a blended cylinder oil to the cylinder based on the load of the engine. The engine requires a certain volume of cylinder oil to achieve anti-wear and friction modifying properties. If more oil is transferred and the predetermined volume, then the blended cylinder oil will be wasted. An increased load will consume more cylinder oil, but some components may be wasted if excess is delivered to the engine. The blender controller 230 is configured to transfer a fixed volume per RPM of the engine, but vary the percentage composition of the blended oil. For example, under a higher load, more additive concentrate or SOx alkalinity agent is used relative to the amount of base oil. This will mean that the increased acidic contaminants generated under a higher load will be neutralised. Under a lower load less additive concentrate or SOx alkalinity agent is used relative to the amount of base oil.

In another embodiment two or more embodiments are combined. Features of one embodiment can be combined with features of other embodiments.

Embodiments of the present invention have been discussed with particular reference to the examples illustrated. However, it will be appreciated that variations and modifications may be made to the examples described within the scope of the invention.

What is claimed is:

1. An oil blending system for a marine diesel two-stroke engine and/or generator comprising:
   a blender having at least one inlet for receiving a lubrication oil and at least one other component and at least one outlet for outputting a mixed lubrication oil composition to the engine or generator;
   at least one sensor for monitoring the engine or generator; and
   a blender controller configured to:
      receive parameter data on the current lubrication oil status used in the engine or generator and receive parameter data on the current engine and/or generator status from the at least one sensor for monitoring the engine or generator;
      compare the parameter data on the current lubrication oil status against a predetermined parameter range based on the current engine and/or generator status;
      determine whether the currently used lubrication oil is within the predetermined parameter range; and
      if the current lubrication oil is outside the predetermined parameter range, determine a new lubrication oil composition for the engine or generator.

2. The oil blending system according to claim 1 wherein the new lubrication oil composition is determined based on the current engine and/or generator status and/or the current used oil status data.

3. The oil blending system according to claim 1 wherein the blender controller is connected to at least a lubrication oil valve or pump controller and at least one other component valve or pump controller wherein the blender controller is configured to send control signals to the valve controllers and/or pump controller for controlling the amount of lubrication oil and at least one other component.

4. The oil blending system according to claim 1 wherein the received parameter data of the current used lubrication oil status is data received from at least one sensor monitoring the current status of the current lubrication oil status.

5. The oil blending system according to claim 4 wherein the at least one sensor monitoring the current status of the current lubrication oil status is one or more of the following: an alkalinity sensor, a viscosity sensor, a temperature sensor, a sulphate sensor, or a contaminate sensor.

6. The oil blending system of claim 4, wherein the at least one sensor is an engine mounted sensor for monitoring at least one of the following: acidity, temperature, elemental contaminants, exhaust, fuel type, fuel line valve status, current fuel parameters, current engine load.

7. The oil blending system according to claim 6 wherein the at least one sensor mounted on the engine comprises a wireless transmitter receiver for communicating with the blender controller.

8. The oil blending system according to claim 1 wherein the blender controller is configured to receive other parameter data relating to one or more of the following: air temperature, water temperature sensor, humidity sensor, weather information, ship status.

9. The oil blending system according to claim 1 wherein the mixed oil composition is a cylinder oil, a system oil or a generator oil.

10. The oil blending system according to claim 1 wherein the at least one other component is a viscosity agent, a detergent, a dispersant, a friction modifier, an anti-wear agent, an alkalinity agent, an antifoam agent, flocculent agent, pour point depressant, antioxidant agent, a polymer thickener agent, corrosion protection agent, extreme pressure additives, or an additive concentrate package.

11. The oil blending system according to claim 1 wherein the at least one other component comprises a used system oil, a fresh system oil, a used cylinder oil, a fresh cylinder oil, a used generator oil or a fresh generator oil to be mixed with the lubrication oil.

12. The oil blending system according to claim 1 wherein the blender comprises a plurality of outlets for different mixed oil compositions.

13. The oil blending system according to claim 1 wherein the blender comprises a plurality of inlets for receiving different components or base oil.

14. A method for blending oil for a marine two-stroke engine and/or generator comprising:
- receiving a lubrication oil and at least one other component in an inlet of a blender;
- receiving in a blender controller parameter data on the current lubrication oil status used in the engine or generator,
- receiving parameter data on the current engine status or generator from at least one sensor monitoring the engine or generator;
- comparing the parameter data on the current lubrication oil status against a predetermined parameter range based on the current engine and/or generator status;
- determining whether the currently used lubrication oil is within the predetermined parameter range; and
- determining a new lubrication oil composition for the engine or generator if the currently used lubrication oil is outside the predetermined parameter range.

15. The method according to claim 14 wherein the method comprises:
- blending the received lubrication oil and at least one other component; and
- outputting from at least one outlet of the blender to the engine or generator a new mixed lubrication oil composition.

* * * * *